US009983902B2

(12) United States Patent
Sykes et al.

(10) Patent No.: US 9,983,902 B2
(45) Date of Patent: May 29, 2018

(54) SYSTEM AND METHOD FOR MULTI-LEVEL REAL-TIME SCHEDULING ANALYSES

(71) Applicant: General Electric Company, Schenectady, NY (US)

(72) Inventors: Gregory Reed Sykes, Grand Rapids, MI (US); Kevin Jones, Grand Rapids, MI (US); Hongwei Liao, Niskayuna, NY (US); Panagiotis Manolios, Sharon, MA (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 144 days.

(21) Appl. No.: 14/712,707

(22) Filed: May 14, 2015

(65) Prior Publication Data

US 2016/0335115 A1 Nov. 17, 2016

(51) Int. Cl.
*G06F 9/46* (2006.01)
*G06F 9/48* (2006.01)

(52) U.S. Cl.
CPC .............. *G06F 9/46* (2013.01); *G06F 9/4887* (2013.01)

(58) Field of Classification Search
CPC ................................ G06F 9/46; G06F 9/4887
USPC .................................. 718/102; 717/159–161
See application file for complete search history.

(56) References Cited

U.S. PATENT DOCUMENTS

| 5,887,143 A * | 3/1999 | Saito ....................... G06F 8/458 709/200 |
| 6,490,611 B1 * | 12/2002 | Shen ..................... G06F 9/4887 718/100 |
| 7,788,673 B2 | 8/2010 | Bibby |
| 8,458,718 B2 | 6/2013 | Hotra et al. |

(Continued)

FOREIGN PATENT DOCUMENTS

| WO | 01/42932 A2 | 6/2001 |
| WO | 2012005637 A1 | 1/2012 |

OTHER PUBLICATIONS

Mirko Jakovljevic, "Time-Triggered Protocol", 2007, in Avionics—Elements, Software and Functions, CRC Press—Taylor & Francis Group, pp. 1-29.*

(Continued)

*Primary Examiner* — Ted T Vo
(74) *Attorney, Agent, or Firm* — Nitin N. Joshi (57) ABSTRACT

A system and method of multi-level scheduling analysis for a general processing module of a real-time operating system. The method includes identifying any processes within respective partitions of the general processing module, for each identified process, determining if the process is local-time centric or global-time centric. The method converts global-time centric process to a local-time centric process, applies a single-level scheduling analysis technique to the processes of respective partitions, and transforms local-time based response times to global-time based response times. The method performs scheduling and response time analyses on one or more of the identified processes of respective (Continued)

partitions. The method can be performed on a synchronous and/or asynchronous system, and on a hierarchical scheduling system that includes a top level scheduler having a static-cyclic schedule and/or a general static schedule. A system and non-transitory computer-readable medium are also disclosed.

18 Claims, 5 Drawing Sheets

(56) References Cited

U.S. PATENT DOCUMENTS

| | | | | |
|---|---|---|---|---|
| 8,543,263 | B2* | 9/2013 | Danielsson | H04L 67/322 |
| | | | | 701/3 |
| 8,918,788 | B2* | 12/2014 | Grouzdev | G06F 9/4881 |
| | | | | 718/103 |
| 2013/0275940 | A1 | 10/2013 | Park et al. | |
| 2013/0305260 | A1 | 11/2013 | Backensto et al. | |
| 2014/0122937 | A1 | 5/2014 | Shin et al. | |

OTHER PUBLICATIONS

Traian Pop et al., "Analysis and Optimisation of Hierarchically Scheduled Multiprocessor Embedded Systems", 2008, Springer, pp. 37-67.*

Rafia Inam et al., "Support for Hierarchical Scheduling in FreeRTOS", 2011, IEEE, 10 pages.*

Sergio Saez et al., "Using Exact Feasibility Tests for Allocating Real-Time Tasks in Multiprocessor Systems", 1997, Universidad Politecnica de Valencia, Spain, 8 pages.*

Delange, Julien et al., "Validate, Simulate and Implement ARINC653 Systems using the AADL", SIGAda '09, Nov. 1-5, 2009, ACM 978-1-60558-475-1, 14pgs.

Easwaran et al., "A Compositional Scheduling Framework for Digital Avionics Systems", IEEE Computer Society 15th IEEE International Conference on Embedded and Real-Time Computing Systems and Applications, pp. 371-380, Aug. 24, 2009.

PCT Search Report and Written Opinion issued in connection with corresponding PCT Application No. PCT/US2016032241 dated Jun. 29, 2016.

* cited by examiner

SYSTEM AND METHOD FOR MULTI-LEVEL REAL-TIME SCHEDULING ANALYSES

BACKGROUND

Real-time operating system (RTOS) software can host multiple software applications of varying levels and complexity on the same hardware. The RTOS software schedules and/or implements the execution of these multiple software applications on the same processors using the same system resources. The operation of the RTOS itself is dependent that specific algorithms be executed on time. Each software application can be referred to as a partition, with its own processor and memory requirements. In an RTOS environment, different partitions can be needed to perform their respective tasks at different rates and with different priorities.

An RTOS system can include a scheduler system which can analyze parameters (duration, priority, interrupt status, etc.) of the various applications to determine an execution schedule for the applications. A real-time scheduling system can include a scheduler, a clock, and processing hardware elements. RTOS systems can be modeled and evaluated based on the scheduler system's evaluation of the RTOS system's capability to meet an application software's process deadline.

Conventional scheduling systems perform scheduling analyses in terms of single-level scheduling, which require special-purpose analyses for multi-level scheduling analyses.

DESCRIPTION

In accordance with embodiments, systems and methods reduce multi-level real-time scheduling analysis problems to single-level scheduling analysis problems by applying transformation and single-level scheduling analysis methods to the multi-level scheduling problem. Embodying systems and methods can apply two-level scheduling using static-cyclic scheduling to the higher-level scheduling problem by allowing arbitrary static schedules at the higher-level to be applicable to multiple levels of scheduling, beyond two.

For discussion purposes, embodying system and method for multi-level real-time scheduling analysis is presented in the context of standards requiring multiple levels of scheduling. However, embodiments and implementations are not so limited and can be applied to other multi-level real-time scheduling situations.

One such multi-level real-time scheduling standard is the ARINC 653 standard, which specifies two levels of scheduling. At the high level, the use of non-preemptive, static scheduling is used to schedule partitions. At the low level, preemptive scheduling is used to schedule processes within partitions. This allows for compositional development, because an integrator can allocate time to different vendor partitions early during the design. This enables application vendors to develop their partitions independently of one another, using whatever intra-partition scheduling method they choose for their own partition. A trusted operating system can enforce the high-level, integrator-provided partition schedule, thereby providing guaranteed separation between partitions.

Embodying systems and methods reduce multi-level real-time scheduling analysis problems to the single-level scheduling analysis problems including schedulability and response time analyses. The term "schedulability" is used to mean a type of analysis that determines if it is possible to schedule a collection of processes on a given partition so that no instantiation of a process can ever miss its deadline. Response time analysis can determine bounds characterizing how much time certain events take—e.g., how much time it takes for a process to complete.

For purposes of this disclosure, a task system of size n consists of a set of periodic, real-time tasks and is denoted by a set of 5-tuples $\{(T_i, p_i, e_i, r_i, d_i)\ 0<=i<n\}$ where:

$T_i$ is the name of a periodic, real-time task that repeatedly asks for execution time. Each instantiation of $T_i$ is a job of $T_i$;

$p_i$ is the period of the task—i.e., how much time elapses between successive jobs of $T_i$;

$e_i$ is the execution time—i.e., the worst-case amount of time any job of task $T_i$ requires; where $0<=e_i<=p_i$;

$r_i$ is the initial release time—i.e., the earliest time that the first job of $T_i$ is available to be executed; usually $r_i<p_i$; and $d_i$ is the deadline: a job must complete within $d_i$ time of its release; where $e_i<=d_i<=p_i$.

Note that, for example, the kth job of $T_i$ gets released at time $r_i+(k-1)p_i$ and must finish by time $r_i+(k-1)p_i+d_i$. The response time of a job is the time between when the job is released and when it finishes executing. Further, the response time of a task is the maximum response time for any job of the task.

For analyses that involve a set of partitions, embodying methods access that part of the high-level static schedule involving the partitions in the set. For this reason, these methods can be useful in the context of compositional development methodology, where partition providers work independently of one another and have guarantees from a process integrator that their work is not affected by changes to the high-level static schedule which do not involve the partitions where their software is executing.

Figure 1:
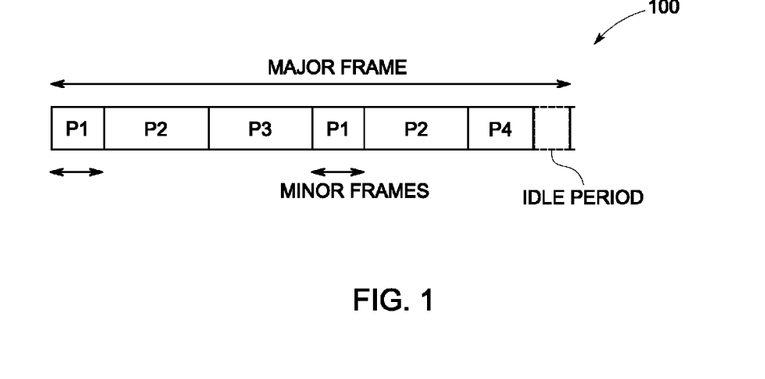
FIG. 1 depicts a conventional two-level scheduling scheme.

FIG. 1 depicts a conventional two-level scheduling scheme used in the ARINC 653 standard. The schedule of General Processing Module (GPM) 100 includes four partitions P1, P2, P3 and P4. FIG. 1 depicts a major frame of the GPM, where partitions P1 and P2 have two minor frames during the major frame, and partitions P3 and P4 each have one minor frame per major frame. The region at the end of the major frame, depicted with a dashed line, corresponds to an idle period. The GPM major frame then repeats.

Each partition contains a set of processes (i.e., software applications) that are scheduled using whatever scheduling scheme the partition owner deems appropriate, independently of how the other partitions are scheduled. It can be the case that a preemptive scheduling scheme is used to schedule processes within partitions. However, at the GPM level, partitions are scheduled in a fixed, non-preemptive manner, e.g., by using static-cyclic scheduling.

In accordance with embodiments the high-level scheduling scheme is based on static-cyclic scheduling. However, embodiments are not so limited and can be applied to any static scheduling scheme. An ARINC 653 scheduling scheme for static-cyclic scheduling can be formalized as follows.

Definition 1

A partition is a 4-tuple (LT, GT, d, p) where:
LT is a local-time set of processes, possibly empty;
GT is a global-time set of processes, possibly empty (local-time and global-time are discussed further below);
d is the duration of the partition, i.e., the amount of contiguous time allocated to the partition in a minor frame; and
p is the period of the partition, i.e., how much time elapses between successive minor frames of the partition. There is a requirement that d≤p.

Definition 2

A GPM is a tuple (PS, fd) where:
PS is a non-empty collection of partitions, $P^1, \ldots, P^n$; and
fd is the major frame duration, i.e., the duration of the major frame of the GPM. The fd value is a multiple of the least common multiple of the periods of the partitions in PS.

Definition 3

A static-cyclic schedule for a GPM is a mapping from partitions to rational numbers denoting partition start times. For example, partition P with duration d and period p is mapped to s, means that partition P has non-preemptive access to the CPU starting at time s for d time, the duration of the partition. It follows that partition P also has access to the CPU at times s+p, s+2p, s+3p, . . . , and each access is for exactly d time. A static-cyclic schedule is valid if at no point in time do two different partitions have access to the CPU.

Definition 4

A GPM is static-cyclic schedulable if there exists a valid static-cyclic schedule for its partitions.

The distinction between local-time and global-time processes is that local-time processes specify their periods with respect to the (local) time of the partition. When their partition is not active, then from their perspective, time does not progress. An example of a local-time process is a high-frequency timer that is expected to run at a particular rate when the partition is active. In contrast, global-time processes have a global view of time from their perspective—time is elapsing even when their partition is not active. The expectation is that most processes will be global-time processes.

As an example, consider GPM 100 where major frame duration fd=100, partition collection PS={P1, P2, P3, P4} and the partitions have durations and periods (d, p) of (10, 50), (20, 50), (20, 100) and (12, 100), respectively. Notice that the GPM is schedulable and in fact, FIG. 1 shows a valid schedule.

For purposes of this example, the composition of partition P1 is processes that are synchronous (they are all released right away) and have the maximum deadline (their deadline is equal to their period). Thus, there is no need to specify the processes' initial release times and deadlines. Partition P1 has one local-time process (T1, 0.25, 0.04), where 0.25 is the period and 0.04 is the execution time. Partition P1 also has four global-time processes: (T2, 50, 0.5), (T3, 50, 3), (T4, 50, 2) and (T5, 100, 5).

Embodying systems and methods determine both if Partition P1 is schedulable and its utilization. Partition P1 has both local-time and global-time processes. The global-time processes are transformed to local-time processes by applying the transformation equation EQ. 1 to the periods of global processes.

$$l(p) = p(P_d/P_p) \quad \text{EQ. 1}$$

Where $P_d$ is the duration of the partition; and
$P_p$ is the period of the partition.
During a global time period of $P_p$, the local time that has elapsed is $P_d$, so we should scale the process period p by a factor of $P_d/P_p$. After applying the transformation of EQ. 1, single-level scheduling analysis can be used to determine schedulability, utilization of partitions, etc.

For example, the utilization of a partition is provided by equation EQ. 2. For example the utilization of partition P1, with the above parameters is $$\sum_{T_i \in LT} e_i/p_i + \sum_{T_i \in GT} e_i/(l(p_i)) = (0.04/0.25) + (0.5/l(50)) + \quad \text{EQ. 2}$$
$$(3/l(50)) + (2/l(50)) + (5/l(100))$$
$$= 0.16 + (0.5/(50(10/50)) +$$
$$(3/(50(10/50)) +$$
$$(2/(50(10/50)) +$$
$$(5/(100(10/50)))$$
$$= 0.16 + 0.05 + 0.3 + 0.2 + 0.25$$
$$= 0.96$$

Because the processes in the transformed partition are harmonic, a feasibility test for harmonic processes can be applied to determine if the partition is schedulable.

Figure 2:
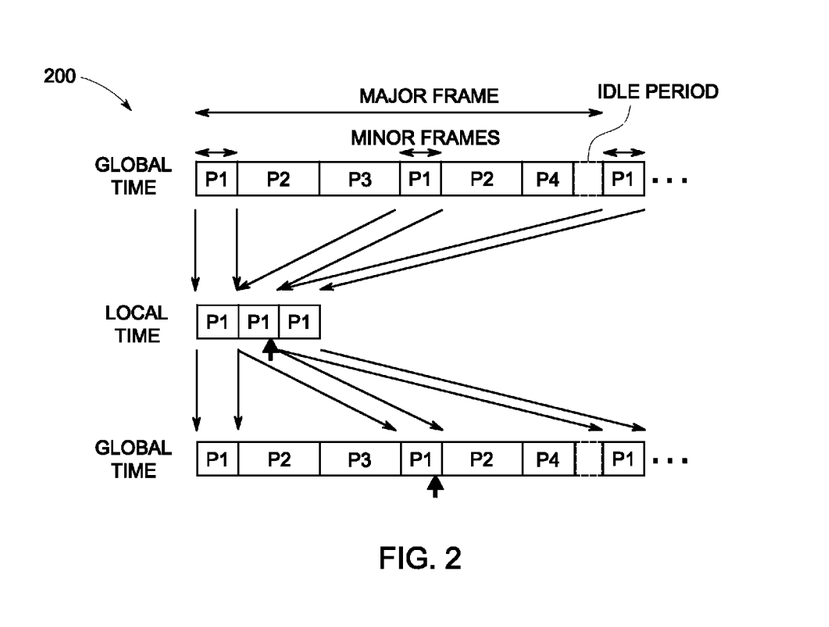
FIG. 2 depicts a multi-level scheduling scheme in accordance with some embodiments.

FIG. 2 depicts a multi-level scheduling scheme for GPM 200 in accordance with some embodiments. When analyzing response times with embodying systems and methods, results can be presented in terms of global time, as opposed to local-time. Response time analysis is performed on the transformed partitions to obtain numbers in terms of local-time.

FIG. 2 starts with the global time view of the system and then depicts the transformed local-time view of the system. For example, suppose that the response time for T5 is 19.2 in local-time. The arrow under the second minor frame of P1 graphically depicts where that occurs in the local-time view of the system. To transform such numbers into global-time numbers, we apply the transformation of equation EQ. 3:

$$g(t) = \begin{cases} 0, & \text{if } t = 0 \\ t + \left(\left\lceil \dfrac{t}{P_d} \right\rceil - 1\right)(P_p - P_d), & \text{otherwise} \end{cases} \quad \text{EQ. 3}$$

Where t is the local time.
Embodying systems and methods add to the local time the time that elapsed while the partition was not active. In this way, local-times can be transformed to global-times. To get the corresponding global time, applying the transformation equation EQ. 3 yields:

$$= 19.2 + \left(\left\lceil \frac{19.2}{10} \right\rceil - 1\right)(50-10)$$
$$= 19.4 + 40$$
$$= 59.2$$

This result (59.2) is consistent with an expected answer if the local-time number is projected back to the global-time view of the system.

The more general approach for computing response times in global-time in a general setting (where release times are not necessarily 0) is to use the formula of equation EQ. 4:

$$g(r+l)-g(l) \qquad \text{EQ. 4}$$

Where l is the release time (local-time); and
r is the response time (local-time).

By way of example, the general approach of EQ. 4 enables embodying methods and systems to be applied to both synchronous and asynchronous systems. Applying equation EQ. 4 to analyze process T5 yields 59.2, the same answer as before because l is 0. However, if l is changed to 5 and r remains unchanged, then the local-time response time remains 19.2, the same as before. However, the response now spans three minor frames of P1, not two, so the global-time response time should change. Using the above formula, we get a response time of g(24.2)−g(5)=99.2, which is 40 more than the response time previously obtained. This increase accounts for the delay from the extra minor frame.

Figure 3:
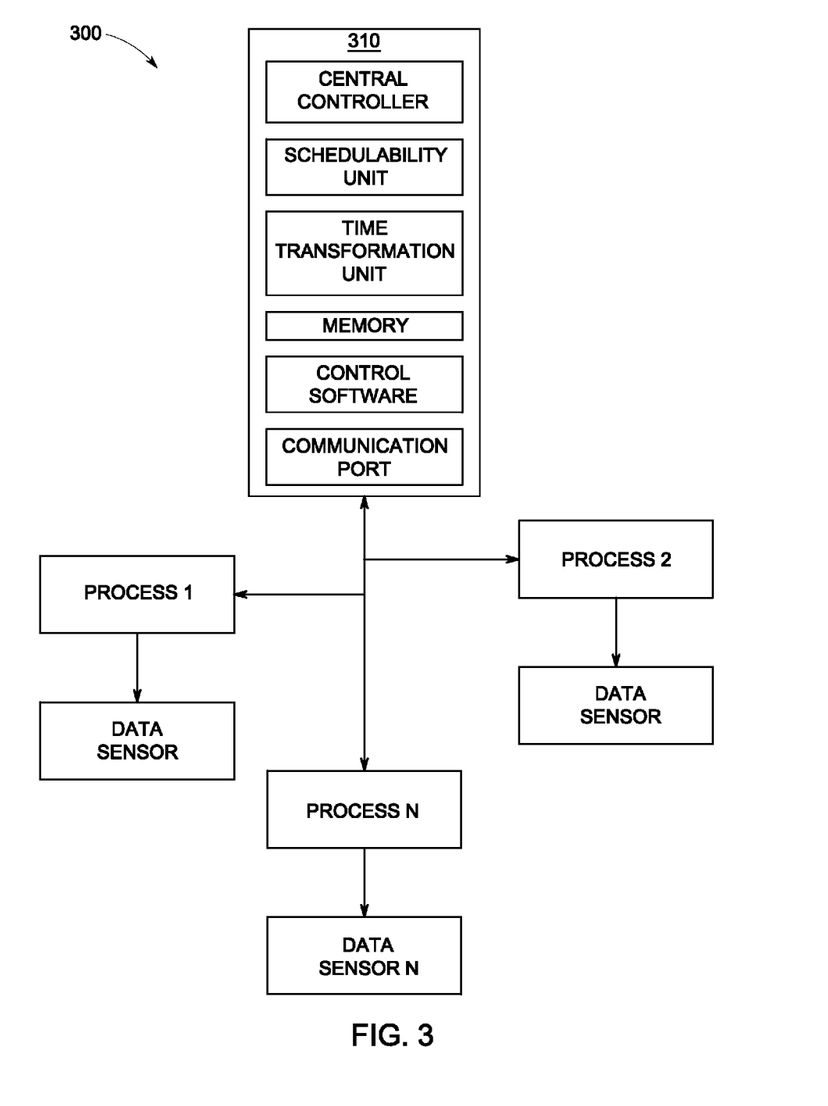
FIG. 3 depicts a scheduling analysis system in accordance with some embodiments.

FIG. 3 depicts scheduling analysis system 300 in accordance with some embodiments. Scheduling analysis system 300 includes scheduling unit 310 that includes a central controller processor, control software, memory, time transformation unit, a schedulability unit, and one or more communication ports. The communication port(s) can be in communication with multiple processes (process1, process2, . . . , processN) that each include one or more software applications to be scheduled. The processes themselves can collect data through associated data sensors In one example, the RTOS system can be an avionics system on-board an airliner. However, embodying systems and methods are not so limited and other RTOS systems are within contemplation and implementation of the disclosed systems and methods.

An airborne avionics system can include multiple processes (e.g., navigation, radar, hydraulic pressure, cockpit display, environmental, etc.). Each of these processes can have many different on-going sub-processes that need to be scheduled. These sub-processes can have different priority levels within the process themselves, and the processes can have different priority levels as well. For example, the collision avoidance sub-process of the radar process can have a higher priority than the weather radar sub-process; and the radar process can have a higher priority than the cabin temperature sub-process of the environmental process. The RTOS relies on the scheduling analysis system to organize the hosting of the multiple processes and their software applications on the same hardware.

The time transformation unit of the scheduling unit transforms the process times between local-time and global-time by applying transformation equations. The schedulability unit determines response times for processes in each partition and performs feasibility tests on all partitions to determine if the schedule is viable—no instantiation of a process can ever miss its deadline.

Embodying systems and methods can be applied to a more general version of the problem, and can be applied to other static scheduling schemes, not just to static-cyclic scheduling (as disclosed above).

To support this general version, partitions and GPMs are defined in a slightly different way.

Definition 5

A partition is a tuple (LT, G7) where:
LT is a local-time set of processes, possibly empty; and
GT is a global-time set of processes, possibly empty.

Definition 6

A GPM is a 3-tuple (PS, S, fd) where:
PS is a non-empty collection of partitions, P1, . . . , Pn;
S a static schedule of the partitions, i.e., a mapping from partitions to a set of intervals such that no two intervals overlap (where intervals can be from the same or from different partitions); and
fd is the major frame duration, i.e., the duration of the major frame of the GPM. This value has to be greater than any number contained in any interval in the static schedule.

The term $S^P$ is used to denote the intervals associated with partition P. The intervals are ordered in increasing order by the interval's supremum (the least number greater than or equal to all numbers contained in the interval). We use $S_i^P$ to denote the ith interval of partition P, using zero-based indexing. Accordingly, $S_0^P$ is the interval in $S^P$ with the smallest supremum.

GPM 100 depicted in FIG. 1 is comprised of the collection of partitions PS={P1, P2, P3, P4}, where fd=100, and the static schedule that maps partitions to sets of intervals is as follows:
$S^{P1}$ is {[0, 10), [50,60)}
$S^{P2}$ is {[10, 30), [60, 80)}
$S^{P3}$ is {[30, 50)}
$S^{P4}$ is {[80, 90)}

Notice that none of the six intervals ($S_0^{P1}$, $S_1^{P1}$, $S_0^{P2}$, $S_1^{P2}$, $S_0^{P3}$, $S_0^{P4}$) overlap with one another. Notice also that this exactly corresponds to the schedule shown in FIG. 1.

As formalized here, the static schedule is given as input to an embodying method. Embodying methods can also be used as part of a process that involves the derivation of the static schedule using some other means. For example, the static schedule can be derived algorithmically from constraints on the partitions; in such cases, embodying methods for multi-level real-time scheduling analysis is applicable.

The transformation from global-time processes to local-time processes disclosed above can also be generalized so that it can be applied to the more general cases. This transformation can be done by applying transformation equation EQ. 5 to the periods of global processes, where $P_d$ is the total duration of the partition in a major frame and fd is the major frame duration.

$$l(p)=p(P_d/fd) \qquad \text{EQ. 5}$$

Where $P_d = \Sigma_{i \in intervals\ of\ P} |i|$

Embodying methods can be applied to a hierarchical scheduling system where the top level has a static-cyclic schedule. EQ. 5 and the following disclosure explains that embodying methods can also be generalized and applied to a hierarchical scheduling system where the top level has any type of static schedule (e.g., one that is not necessarily cyclic). EQ. 5 is "parallel" to EQ. 1, in terms of the above generalization.

During a global-time period of fd (the major frame duration), the local time that has elapsed is $P_d$, so the process period, p, is scaled by $P_d/fd$. After applying the transformation EQ. 5, single-level scheduling analysis can be performed to determine schedulability, utilization of partitions, etc. For example, the utilization of P1 (the processes of P1 were defined above) is:

$$\sum_{T_i \in LT} e_i/p_i + \sum_{T_i \in GT} e_i/(l(p_i)) = (0.04/0.25) + (0.5/l(50)) +$$
$$(3/l(50)) + (2/l(50)) + (5/l(100))$$
$$= 0.16 + (0.5/(50(20/100)) +$$
$$(3/(50(20/100)) +$$
$$(2/(50(20/100)) +$$
$$(5/(100(20/100))$$
$$= 0.16 + 0.05 + 0.3 + 0.2 + 0.25$$
$$= 0.96$$

This calculation agrees with the utilization calculation from detailed above. As mentioned, for certain analyses (such as response time analyses), the results are better presented in terms of global-time, not local-time. Response time analysis is still performed on the transformed partitions to obtain numbers in terms of local-time. To transform these results into global-time numbers, transformation equation EQ. 6 is applied:

$$g(t) = \begin{cases} 0, & \text{if } t = 0 \\ fd(\lceil \frac{t}{P_d} \rceil - 1) + F(t - fd\lfloor \frac{t}{P_d} \rfloor, 0, 0), & \text{otherwise} \end{cases} \quad \text{EQ. 6}$$

where sup(X) is supremum of the intervals in X;

$$F(t, i, r) = \begin{cases} t + r, & \text{if } t \leq |S_i^P| \\ F(t - |S_i^P|, i+1, r + \inf(\{S_{i+1}^P\}) - \inf(\{S_i^P\})), & \text{otherwise} \end{cases}$$

where inf(X) is the infimum of the intervals in X—i.e., the largest number less than or equal to all the numbers contained in the intervals of X. Note that EQ. 6 is parallel to EQ. 3, above.

If t is a multiple of Pd and greater than 0, then t in local-time corresponds to t/Pd major frames (notice that this fraction is a positive integer) in global-time. In this case, t/Pd−1 major frames will elapse plus the time required for partition P to complete execution in the last major frame.

If t is not a multiple of $P_d$ then the number of major frames that t completely covers is accounted, and then determine how many minor frames of P elapse. The function F iterates through the minor frames, in order, and it is guaranteed to terminate by the time i reaches the number of intervals in the static schedule associated with P.

Again looking at the prior example, where the response time for T5 was determined to be 19.2 in local-time. To get the corresponding global time, applying transformation equation EQ. 6 yields:

$$\frac{100(\lceil 19.2/20 \rceil - 1) +}{F(19.2 - 100[19.2/20], 0, 0)} = 100 \cdot 0 + F(19.2 - 100 \cdot 0, 0, 0)$$
$$= 0 + F(19.2, 0, 0)$$
$$= F(9.2, 1, 0 + 50 - 0)$$
$$= F(9.2, 1, 50)$$
$$= 9.2 + 50$$
$$= 59.2$$

In a general setting where release times are not necessarily 0, the more general method for computing response times in global-time is to use the formula of equation EQ. 7:

$$g(r+l)-g(l) \quad \text{EQ. 7}$$

where l is the release time (local-time);

and r is the response time (local-time). Using formula EQ. 7 to analyze process T5 yields 59.2, the same answer as before because l=0 and g(0)=F(0,0,0)=0.

However, if l is changed to 5, and r remains unchanged, then while the local-time response time is 19.2 (the same as before), the response now spans three minor frames of P1, not two. Accordingly, the global-time response time should change. Using equation EQ. 7 yields a response time of g(24.2)−g(5)=99.2, which is 40 more than the response time obtained previously. This increased response time accounts for the delay from the extra minor frame.

Embodying systems and methods can also be applicable when the number of scheduling levels exceeds two. For example, a partition can be further subdivided into sub-partitions, and these sub-partitions can be further subdivided, leading to an arbitrarily deep hierarchy of partitions. This hierarchy can be organized as a tree, where the leaf partitions are the ones that have processes associated with them.

Figure 4:
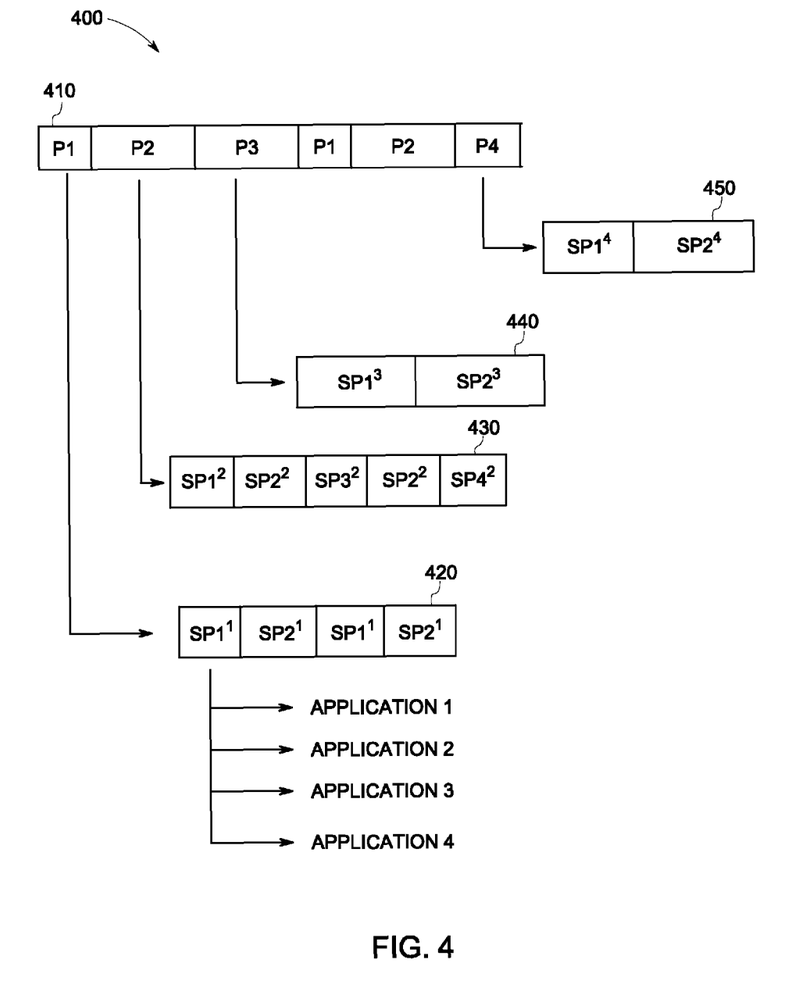
FIG. 4 depicts a multi-level hierarchy scheduling scheme in accordance with some embodiments.

FIG. 4 depicts multi-level hierarchy scheduling scheme 400 in accordance with some embodiments. For instance, each minor frame 410 partition P1 includes two sub-minor frame 420 partitions $SP1^1$, $SP1^2$, where $SP1^1$ includes four applications Application1, Application2, Application3, Application4 to be scheduled. The partitions can be scheduled using any non-preemptive static scheduling scheme and the processes associated with the leaf partitions can be scheduled using any kind of scheduling at all. For example, preemptive scheduling can be used. Embodying systems and methods can be used to perform analyses in this context because of its compositional nature—information regarding the intervals of time allocated to the partitions involved in the analysis is all that is needed.

Figure 5:
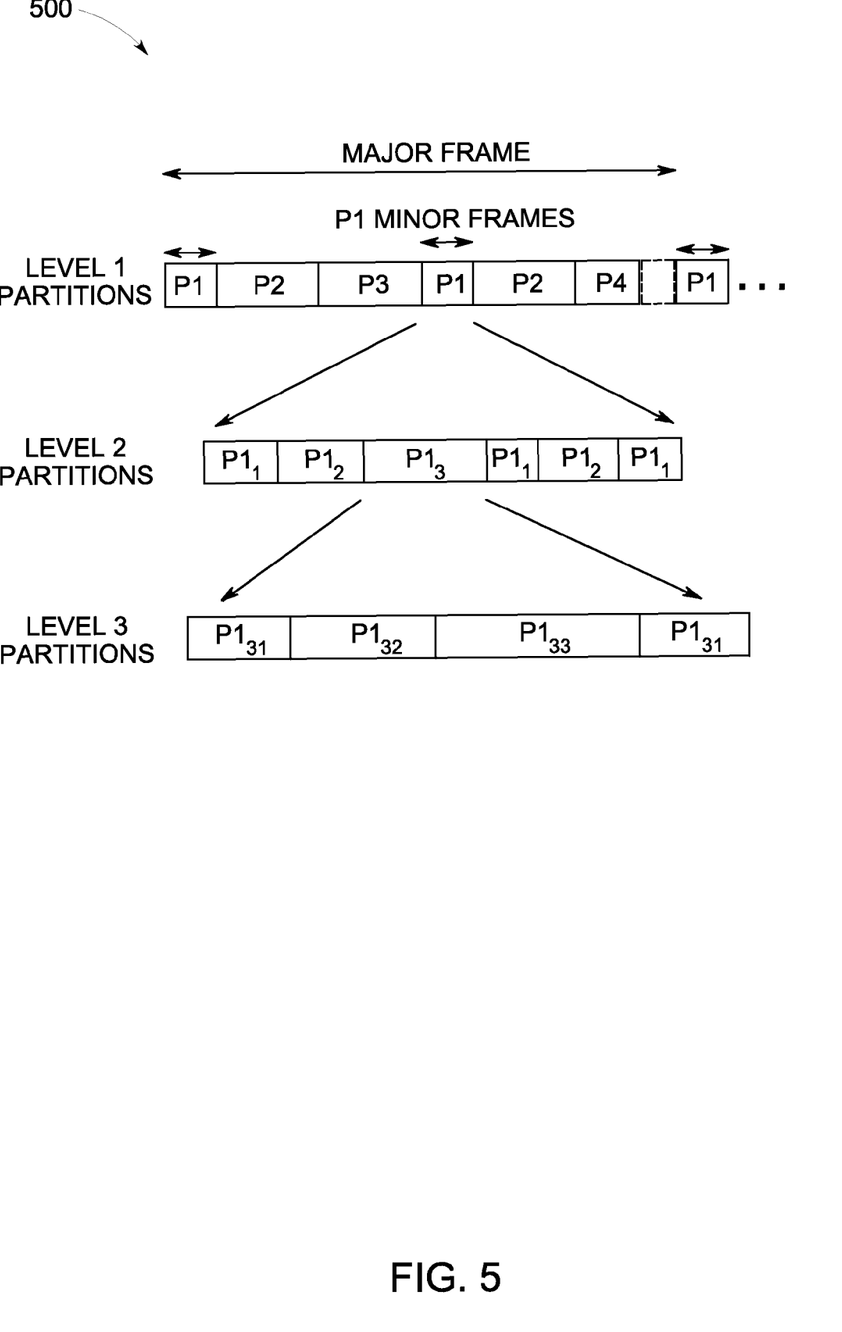
FIG. 5 depicts another multi-level hierarchy scheduling scheme in accordance with some embodiments.

FIG. 5 depicts multi-level hierarchy scheduling scheme 500 in accordance with some embodiments. As illustrated in FIGS. 4-5, embodying methods can be applicable when the number of scheduling levels exceeds two. For example as depicted in FIGS. 4-5, a partition can be further subdivided into sub-partitions, and these sub-partitions can be further subdivided, leading to an arbitrarily deep hierarchy of partitions. As depicted in FIG. 5, minor partition P1 is a level 1 partition that is comprised of sub-partitions $P1_1$, $P1_2$, $P1_3$. In this example, one of these sub-partitions is the level 2 partition $P1_3$, which is itself also comprised of sub-partitions $P1_{31}$, $P1_{32}$, $P1_{33}$. Partitions that have no sub-partitions of their own are referred to as terminal partitions. In this example, the terminal partitions depicted in FIG. 5 are partitions P2, P3, P4, and sub-partitions $P1_1$, $P1_2$, $P1_{31}$, $P1_{32}$, and $P1_{33}$. Non-terminal partitions are the hierarchical partitions, e.g., partitions P1 and $P1_3$. However, embodying systems and methods are not so limited. Other examples of multi-level hierarchy scheduling schemes are within the contemplation of this disclosure.

Each terminal partition can have its own scheduling scheme, e.g., partition P2 can use Rate Monotonic (RM) scheduling while partition $P1_2$ uses Deadline Monotonic (DM) scheduling and partition $P1_{32}$ uses Earliest Deadline First (EDF) scheduling.

Each hierarchical partition can have its own static scheduling scheme, e.g., P1 can use a custom static scheduling scheme, while $P1_3$ uses static cyclic scheduling.

Definition 7

A terminal partition is a tuple (LT, GT) where:
LT is a local-time set of processes, possibly empty; and
GT is a global-time set of processes, possibly empty.

Notice that terminal partitions are defined similar to the way partitions were defined above in Definition 1. Next, GPMs can be defined using an extension of Definition 2:

Definition 8

A GPM is a 3-tuple (PS, S, fd) where:
PS is a non-empty collection of either terminal or hierarchical partitions, $P^1, \ldots, P^n$;
S a static schedule of the partitions—i.e., a mapping from partitions to a set of intervals such that no two intervals overlap (where intervals can be from the same or from different partitions); and
fd is the major frame duration—i.e., the duration of the major frame of the GPM. This value has to be greater than any number contained in any interval in the static schedule.

Finally, hierarchical partitions are defined. A hierarchical partition can contain hierarchical partitions, therefore the definition is self-referential but still well-defined (as is common with inductive types). Since a hierarchical partition has a parent (either a GPM or another hierarchical partition), it inherits from its parent's static schedule a set of intervals that it can access.

Definition 9

A hierarchical partition is a 3-tuple (I, PS, S) where:
I is a set of intervals that the partition can access. I must be equal to the set of intervals inherited from the static schedule of the partition's parent;
PS is a non-empty collection of (either terminal or hierarchical) partitions, $P^1, \ldots, P^n$; and
S a static schedule of the partitions, i.e., a mapping from partitions to a set of intervals, subject to the following two constraints:
1. No two intervals from the partitions of the hierarchical partition (i.e., $P^1, \ldots, P^n$) overlap.
2. The intervals of $P^1, \ldots, P^n$ are contained in the intervals of I.

The second constraint associated with static schedules in the definition of hierarchical partitions guarantees that the partition can only be active during intervals of time that it owns (as defined by its parent's static schedule). For example, with regard to FIG. 5, if the intervals of hierarchical partition P1 are J={[0, 10), [50, 60)}, then the intervals of $P1_3$ have to be contained in J and cannot overlap with the intervals of $P1_1$ or $P1_2$ (which also have to be contained in J).

In accordance with embodiments, a multi-level scheduling scheme can enable compositional design within a partition. For example, in FIG. 5 partition $P1_3$ is decomposed into three partitions $P1_{31}$, $P1_{32}$, $P1_{32}$; where (for example) $P1_{31}$ can contain the safety-critical periodic processes and uses RM scheduling, while $P1_{32}$ can contain the remaining periodic processes and uses DM scheduling. Partition $P1_{33}$ can contain the sporadic processes and uses EDF scheduling. The partitions $P1_{31}$, $P1_{32}$, and $P1_{33}$ can have different groups as owners, working independently.

Embodying systems and methods minimize the amount of global interaction required to develop partitions. For example, the development of partition $P1_{32}$ can be done independently of the development of the other four terminal partitions $P1_1$, $P1_2$, $P1_{31}$, and $P1_{33}$ associated with partition P1. In the standard ARINC 653 context, all of these partitions would be part of P1, and there would be no built-in mechanism to isolate their development.

Embodying systems and methods account for costs and project management. Since each terminal partition is isolated from the others, it is easier to determine project costs and to track and manage the personnel, time, and other resources allocated to projects. Further, embodying systems and methods can use RTOS-level protection mechanisms to isolate interference between processes. For example an RTOS can be used to guarantee that processes of $P1_3$ that are in different terminal partitions are isolated.

Embodying systems and methods can use different scheduling schemes for different classes of processes. For example, as described above, partition $P1_3$ contains three sub-partitions, each with a different scheduling scheme.

Embodying systems and methods include the ability to hide information and/or restrict access to partitions from different groups working on the partitions. There are many reasons to do this. For example, if sub-contractors are used to develop a partition, then hiding corporate data from subcontractors may be desirable. Another example is when engineers working on one partition do not have the clearance needed to see the data associated with another partition.

Embodying systems and methods simplify the certification argument. For example, one can group processes into partitions based on criticality levels. As described above with regard to FIG. 5, sub-partition $P1_{31}$ is a sub-partition of partition $P1_3$ that contained the safety-critical periodic processes and used a very well-understood scheduling scheme, RM. This makes the certification argument simpler, while allowing dynamic scheduling (EDF) to be used in another sub-partition of $P1_3$, namely $P1_{33}$.

Embodying systems and methods can perform analyses in the context of multi-level scheduling using only local information. Due to the compositional nature of embodying methods, common analyses only requires information regarding the intervals of time allocated to the partition involved in the analysis. In addition, different types of analysis can be performed for different partitions. For example, WCET (worst case execution timing) using very rigorous methods can be used for safety-critical partitions and measurement-based methods can be used for partitions with soft (but not safety-critical) performance requirements. The global and local time transformations are performed using the formulas disclosed above.

Figure 6:
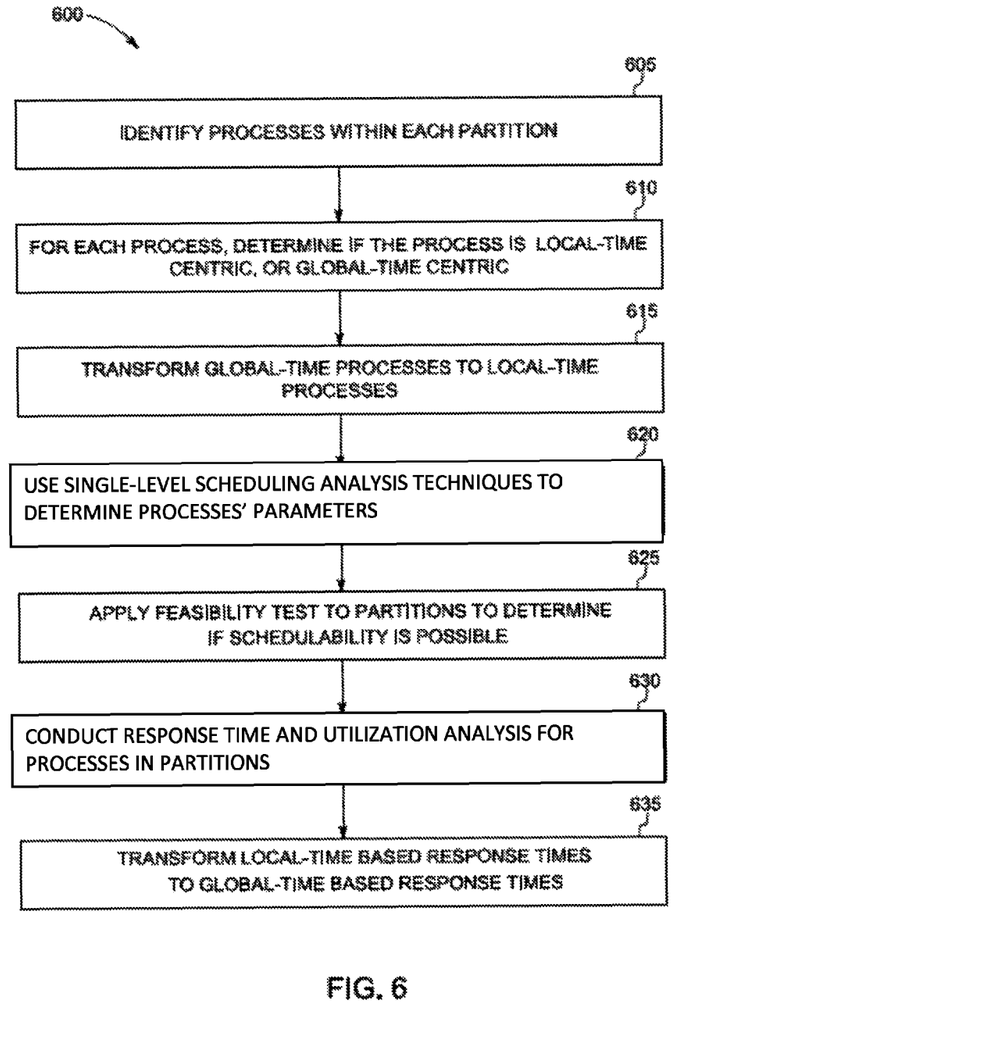
FIG. 6 depicts a multi-level scheduling process in accordance with some embodiments.

FIG. 6 depicts multi-level scheduling process 600 in accordance with some embodiments. Process 600 identifies the processes within each partition, step 605.

After identifying the processes, a determination is made, step 610, as to whether each processes is a local-time centric or a global-time centric process. For the processes that are global-time centric, a transformation is performed, step 615, to convert the processes to local-time process. This transformation can be done by applying transformation equations discussed above.

After the transformation to local-time centric-ness, a single-level scheduling analysis technique can be applied, step 620, to determine the processes' parameters (e.g., duration, response time, priority, utilization, interrupt status, etc.). A feasibility test can be performed, step 625, on the partitions to determine the overall schedulability of the partition (e.g., if it is possible to schedule a collection of processes on a given partition so that no instantiation of a process can ever miss its deadline). For processes in the partitions, a response time analysis and utilization analysis can be conducted, step 630. Local-time based response times can be transformed, step 635, to global-time based response times.

The local-to-global and global-to-local transformations can be used as a bridge to move from ARINC 653 settings to one-level scheduling settings. This allows embodying systems and methods to transfer existing analyses, which are for the most part based on the simpler one-level scheduling setting, to the more complex two-level ARINC 653 setting.

This bridging allows embodying systems and methods to perform schedulability analyses in a one-level scheduling setting and to transfer these analyses to the ARINC 653 setting. The method presented here can be used for any two-level or multi-level scheduling scheme and it can be used when partitions are scheduled using static-cyclic scheduling or any other non-preemptive, static scheduling scheme.

There is a distinction between local-time and global-time processes. Global-time processes have a global view of time, i.e., from their perspective, time is always elapsing. In contrast, local-time processes have a local view of time, i.e., from their perspective, time elapses only when their partition is active. This distinction makes it convenient to model processes such as a high-frequency timer that is expected to run at a particular rate when a particular partition is active. Embodying systems and methods support partitions that include both local-time and global-time processes.

In accordance with some embodiments, a computer program application stored in non-volatile memory or computer-readable medium (e.g., register memory, processor cache, RAM, ROM, hard drive, flash memory, CD ROM, magnetic media, etc.) may include code or executable instructions that when executed may instruct and/or cause a controller or processor to perform methods discussed herein such as a method for multi-level scheduling analysis for a general processing module of a real-time operating system, as described above.

The computer-readable medium may be a non-transitory computer-readable media including all forms and types of memory and all computer-readable media except for a transitory, propagating signal. In one implementation, the non-volatile memory or computer-readable medium may be external memory.

Although specific hardware and methods have been described herein, note that any number of other configurations may be provided in accordance with embodiments of the invention. Thus, while there have been shown, described, and pointed out fundamental novel features of the invention, it will be understood that various omissions, substitutions, and changes in the form and details of the illustrated embodiments, and in their operation, may be made by those skilled in the art without departing from the spirit and scope of the invention. Substitutions of elements from one embodiment to another are also fully intended and contemplated. The invention is defined solely with regard to the claims appended hereto, and equivalents of the recitations therein.

The invention claimed is:

1. A method of multi-level scheduling analysis for a general processing module of a real-time operating system, the general processing module having two or more partitions in which processes of the real-time operating system are executed, the method comprising:
    identifying any processes within respective partitions of the general processing module;
    for each identified process, determining if the process is local-time centric or global-time centric;
    converting global-time centric process to a local-time centric process;
    applying a single-level scheduling analysis technique to the processes of respective partitions;
    transforming local-time based response times within a process to global-time based response times;
    applying a feasibility test on transformed processes within a partition to determine if the partition is schedulable; and
    if the partition is schedulable, then providing an indication that the transformed processes can be scheduled within the partition such that an instantiation of the transformed process cannot miss its deadline.

2. The method of claim 1, where applying the single-level scheduling analysis technique determines parameters for the processes.

3. The method of claim 2, where the parameters include at least one of duration, response time, priority, utilization, and interrupt status.

4. The method of claim 1, including performing a response time analysis on one or more of the identified processes of respective partitions.

5. The method of claim 1, wherein the method is performed on one of a synchronous system and an asynchronous system.

6. The method of claim 1, wherein the method is performed on a hierarchical scheduling system.

7. The method of claim 6, wherein the hierarchical scheduling system includes a top level having one of a static-cyclic schedule and a general static schedule.

8. The method of claim 1, wherein transforming global-time centric processes to local-time centric processes, with the top level scheduler using a static-cyclic schedule, includes scaling a global-time centric process period by a ratio of a partition duration to the partition period.

9. The method of claim 1, wherein converting global-time centric processes to local-time centric processes, with a top level scheduler using a general static schedule, includes scaling a global-time centric process period by a ratio of a total duration of the partition in a major frame to a duration of the major frame.

10. The method of claim 1, including adding elapsed time to a partition local-time to transform the local-time based response time to the global-time based response time.

11. The method of claim 1, wherein at least one of the partitions is subdivided into a first level of sub-partitions.

12. The method of claim 11, wherein at least one of the first level sub-partitions is further subdivided into one or more lower level sub-partitions of arbitrary depth.

13. A system of multi-level scheduling analysis for a general processing module of a real-time operating system, the general processing module including partitions in which processes of the real-time operating system are executed, the system comprising:

a scheduling unit including a central controller processor;
a schedulability unit configured to perform scheduling analyses for processes in each partition;
a time transformation unit configured to transform process parameters and times between local-time and global-time by applying transformation methods; and
the central controller processor configured to execute instructions that cause the central controller processor to perform the steps of:
identifying any processes within respective partitions of the general processing module;
for each identified process, determining if the process is local-time centric or global-time centric;
converting global-time centric process to a local-time centric process;
applying a single-level scheduling analysis technique to the processes of respective partitions;
transforming local-time based response times within a process to global-time based response times;
applying a feasibility test on transformed processes within a partition to determine if the partition is schedulable; and
if the partition is schedulable, then providing an indication that the transformed processes can be scheduled within the partition such that an instantiation of the transformed process cannot miss its deadline.

14. The system of claim 13, wherein converting global-time centric processes to local-time centric processes includes scaling a global-time centric process period by a ratio of a total duration of the partition in a major frame to a duration of the major frame.

15. The system of claim 13, wherein transforming local-time based response times to global-time based response times includes adding elapsed time to a partition local-time to transform the local-time based response time to the global-time based response time.

16. A non-transitory computer-readable medium having stored thereon instructions which when executed by a central controller processor cause the processor to perform a method of multi-level scheduling analysis for a general processing module of a real-time operating system, the general processing module having two or more partitions in which processes of the real-time operating system are executed, the method comprising:
identifying any processes within respective partitions of the general processing module;
for each identified process, determining if the process is local-time centric or global-time centric;
converting global-time centric process to a local-time centric process;
applying a single-level scheduling analysis technique to the processes of respective partitions;
performing a schedulability analysis on a partition to determine whether an instantiation of a process can miss a deadline;
transforming local-time based response times within a process to global-time based response times;
applying a feasibility test on transformed processes within a partition to determine if the partition is schedulable; and
if the partition is schedulable, then providing an indication that the transformed processes can be scheduled within the partition such that an instantiation of the transformed process cannot miss its deadline.

17. The non-transitory computer-readable medium of claim 16, the instructions further configured to cause the central controller processor to perform the step of converting global-time centric processes to local-time centric processes includes scaling a global-time centric process period by a ratio of a total duration of the partition in a major frame to a duration of the major frame.

18. The non-transitory computer-readable medium of claim 16, the instructions further configured to cause the central controller processor to perform the step of transforming local-time based response times to global-time based response times by adding elapsed time to a partition local-time to transform the local-time based response time to the global-time based response time.

* * * * *